United States Patent [19]

Hanley

[11] 4,421,444
[45] Dec. 20, 1983

[54] METHOD OF ATTACHING CLOSURE MEMBER TO FILTER HOUSING

[75] Inventor: William Hanley, Pawtucket, R.I.

[73] Assignee: Fram Corporation, East Providence, R.I.

[21] Appl. No.: 315,764

[22] Filed: Oct. 28, 1981

Related U.S. Application Data

[62] Division of Ser. No. 156,882, Jun. 5, 1980, Pat. No. 4,314,903.

[51] Int. Cl.³ ............................................. B21D 51/00
[52] U.S. Cl. ............................................. 413/4; 413/6
[58] Field of Search ............... 413/4, 6; 210/131, 440, 210/443, 444, DIG. 17

[56] References Cited

U.S. PATENT DOCUMENTS 3,321,083 5/1967 Thornton .......................... 210/198.1
3,385,249 5/1968 Czarnecki .............................. 413/6

FOREIGN PATENT DOCUMENTS 52-32176 11/1977 Japan ...................................... 210/44

Primary Examiner—Leon Gilden
Attorney, Agent, or Firm—Ken C. Decker; William N. Antonis

[57] ABSTRACT

A fluid filter of the disposable automotive spin-on type has a cup-shaped member and a closure member which together form a chamber for receiving a filtering media. The cup-shaped member has a relatively thin side wall and an open end defined by a marginal edge including a bead. The closure member is a one-piece stamping of uniform thickness and substantially thicker than the cup-shaped member. The closure member closes the open end of the cup-shaped member and includes an annular rim which extends perpendicularly to the plane of the closure member and generally parallel to the side wall of the cup-shaped member. A channel defined by the rim receives the bead of the cup-shaped member and the rim is crimped to form a fluid-tight connection between the members.

3 Claims, 9 Drawing Figures

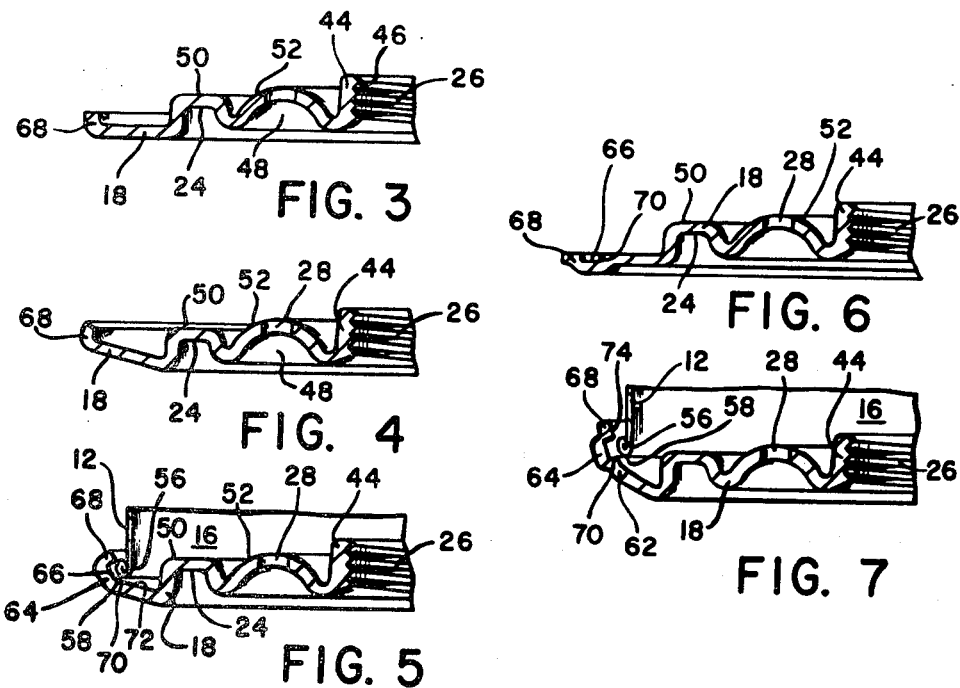
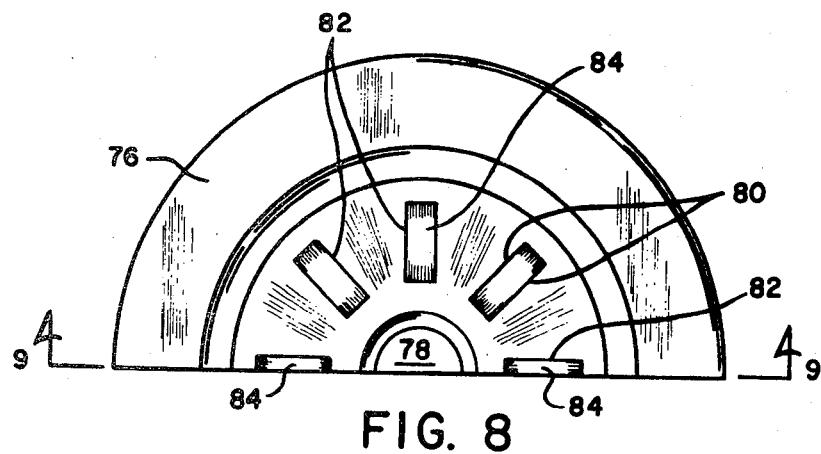
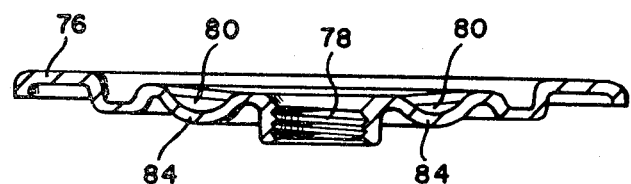

METHOD OF ATTACHING CLOSURE MEMBER TO FILTER HOUSING

This is a division of application Ser. No. 156,882, filed June 5, 1980 now U.S. Pat. No. 4,314,903.

The invention relates to an automotive oil filter. The filter includes a unitary closure member which is permanently joined in fluid-tight manner to the open end of a cup-shaped housing and which cooperates with the cup-shaped housing to form a chamber for holding filter media. The closure member includes openings for fluid flow communication to and from the filter. One of the openings is threaded and the filter is mounted by screwing it on to a threaded stem of an engine.

Filters of this type are commonly referred to as being of the spin-on type and are used generally to filter the lubricating oil of internal combustion engine, particularly automotive vehicle engines. A filter of this type is known in accordance with U.S. Pat. No. 3,231,089 to Thornton in which the closure member includes two components which are fastened together. One of the components includes openings for fluid flow communication to and from the filter. One of the openings is threaded for operatively mounting the filter. The other component of the closure member is relatively thin, is welded to the first component, and connects the first component to the cup-shaped outer shell of the filter. The other component also carries a resilient sealing member operative upon installation of the filter to complete a closed fluid flow path through the filter.

Manufacture of filters with two-piece closure members requires the formation of the two separate closure member components and usually involves welding these components together before they are joined to the cup-shaped member. The multiplicity of forming and welding operations necessary to form such a closure member contributes substantially to the overall cost of the filter.

The invention as claimed eliminates the welding operation by providing a unitary closure member, and thereby reduces the overall cost of manufacturing the closure member.

The advantages offered by the invention are mainly that the closure member is a unitary or one-piece component; no welding operation is required in its manufacture; it is formed from a single work piece or blank which is punched from sheet material and performs all of the functions performed by the prior two-piece construction while affording a reduced cost of manufacture.

Two ways of carrying out the invention are described in detail below with reference to drawings which illustrate only these two specific embodiments, in which:

FIGS. 3, 4 and 5 are fragmentary cross-sectional views and illustrate steps in the process of making a unitary closure member according to the FIG. 1 embodiment of my invention, components having been omitted from FIG. 5 for clarity of illustration.

FIGS. 6 and 7 are similar to FIGS. 3-5 and illustrate steps in the process of making a unitary closure member according to the FIG. 2 embodiment, components also having been omitted from FIG. 7 for clarity of illustration.

FIG. 8 is a fragmentary plan view of a closure member and illustrates my novel way of forming fluid flow openings therein.

FIG. 9 is a cross-sectional view along the line 9—9 of FIG. 8.

Figure 1:
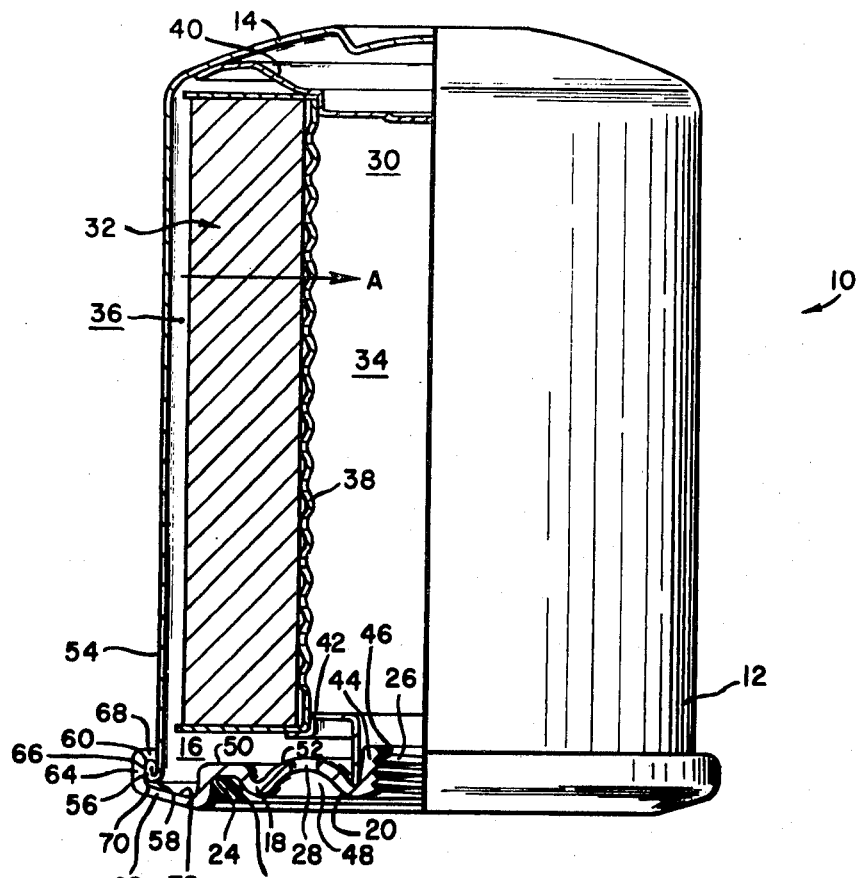
FIG. 1 is a side elevational view, partly in section, of a filter embodying the features of my invention.

FIG. 1 shows a filter 10 which includes an outer metal shell or cup-shaped housing 12 which has a closed end 14 and an open end 16 which is closed by a closure member or cap generally indicated by the numeral 18. The outer face 20 of member 18 carries an annular seal 22 which is received in an annular recess 24 and which engages with the engine on which the filter 10 is installed to prevent fluid from leaking at the interface between the filter and the engine. The closure member 18 is provided with a threaded opening 26 which may be screwed onto a supporting stem or stud carried by the engine when the filter is installed thereon. The opening 26 also serves as an outlet port for the filter 10. Openings 28 are spaced circumferentially around the member 18 to serve as inlet ports.

Cup-shaped member 12 and closure member 18 define a chamber 30. An annular, cylindrical, pleated-paper filtering media 32 is received in chamber 30. The filter media 32 divides chamber 30 into a first compartment 34 and a second compartment 36. Filter media 32 includes a center tube 38 and is supported by an annular spring 40 which engages the closed end 14 of cup-shaped member 12 and which urges media 32 downward onto an annular member 42 which rests upon closure member 18. The closure member 18, the annular member 42, the cup-shaped member 12 and the spring 40 cooperate to define a flow path communicating inlet ports 28 to compartment 36. When the engine is in operation, oil is forced through the filtering media 32 in the direction of arrow A by the engine oil pressure so that the oil is filtered as it passes through the media 32 and is communicated to the outlet 26 via the compartment 34 defined within the center tube 38.

The closure member 18 is a single stamped member of substantially uniform thickness and includes an annular lip 44 which surrounds the opening 26 and in which screw threads 46 are formed. A first annular recess 48 is formed radially outwardly of opening 26 and openings 28 communicate recess 48 with compartment 36. A second annular recess 24 is formed radially outwardly of recess 48 and receives the sealing member 22. Because the closure member 18 is substantially uniform in thickness, the recesses 24 and 48 cause the closure member to define protrusions 50 and 52, respectively, which extend opposite the recesses and into the chamber 16 of the filter.

Cup-shaped member 12 includes a relatively thin side wall 54. In order to join the cup-shaped member and the closure member together, a bead 56 is formed in the side wall 54 at the open end of the cup-shaped member. The bead 56 defines the marginal edge 58 of the cup-shaped member and also defines a shoulder 60. The closure member 18 includes a marginal edge 62 which includes an annular rim 64 projecting perpendicular to the plane of the closure member and generally parallel to the side wall 54 of the cup-shaped member. The rim 64 is substantially the same thickness as the remainder of the closure member 18 and is, therefore, substantially thicker than the cup-shaped member 12. A channel 66 is defined by the rim 64 and receives the bead 56 of cup-shaped member 12. The channel 66 is defined by a pair of radially projecting, circumferentially extending walls 68 and 70. An upper edge portion of the rim 64, which projects radially inward toward the side wall 54 of the cup-shaped member and which engages the shoulder 60, defines the wall 68. The lower wall 70 is defined by a portion of marginal edge 62 and has an inner surface 72 which engages the marginal edge 58 of the cup-shaped member. The rim 64 is crimped so that the wall 68 tightly engages the shoulder 60 and forces the marginal edge 58 into permanent fluid-tight engagement with the surface 72 of closure member 18.

Figure 2:
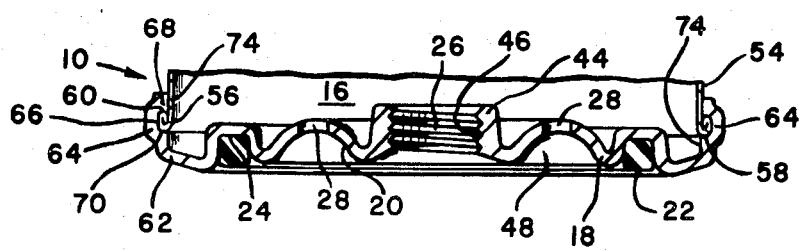
FIG. 2 is a fragmentary cross-sectional view of another embodiment of my invention with parts omitted for clarity of illustration.

FIG. 2 illustrates another embodiment of my invention, which, with the exception of features to be hereinafter explained, is the same as the FIG. 1 embodiment. Thus, the same reference numerals are used throughout to designate analagous components or features. In the embodiment of FIG. 2, the marginal edge 62 of closure member 18 includes an upturned annular rim 64 which projects perpendicularly to the plane of closure member 18 and generally parallel to the side wall 54 of cup-shaped member 12 and which defines an inner cylindrical surface 74. An annular channel 66 circumscribes the surface 74 and receives bead 56 of cup-shaped member 12. The rim 64 includes an upper edge portion 68 which defines the upper wall of the channel 66. Channel 66 includes a wall 70 which is opposite to wall 68 and which engages the marginal edge 58 of cup-shaped member 12. The rim 64 is crimped so that the wall 68 tightly engages the shoulder 60 of bead 56 and forces the marginal edge 58 of the cup-shaped member into fluid-tight engagement with the wall 70.

FIGS. 3, 4 and 5 illustrate steps in the process of making a unitary closure member 18 used in the embodiment of FIG. 1 of my invention. It will be understood with regard to FIGS. 3-7, that the closure member is symmetrical about a vertical center line which passes through the center of opening 26.

FIG. 3 illustrates the closure member at an intermediate step of the process of manufacture and those skilled in the art will understand that the number is advantageously originated by cutting or punching a circular disc or blank from a sheet of material, for example, from a sheet of steel. The blank will preferably have a central hole therein and the material adjacent this hole is stamped in a direction perpendicular to the plane of the blank to form opening 26 and lip 44 in which threads 46 are formed. Openings 28 are formed by a punching operation which may include a stamping operation to form annular recess 48. Annular recess 24 is formed radially outwardly from the holes 28 by a stamping operation. A bend is made in the blank at the marginal edge thereof to form what is to become wall 68 and the upper edge portion of rim 64.

As illustrated in FIG. 4, the blank is bent or formed radially outwardly of recess 24 to form a frustoconical shape.

An additional bend is made in the marginal edge of the blank, as illustrated in FIG. 5, between recess 24 and edge portion 68 to form annular rim 64, which is disposed substantially perpendicularly to the plane of the closure member. FIG. 5 also illustrates the positioning of a cup-shaped member 12 in engagement at its marginal edge 58 with the inner surface 72 of closure member 18 preparatory to the joining of these components. Those skilled in the art will understand that the joining of parts 12 and 18 to their FIG. 1 condition may be accomplished by crimping or rolling or by a variety of other means which brings rim 64 into fluid-tight engagement with the marginal edge 58 and with the head 56.

FIGS. 6 and 7 illustrate steps in the process of making a closure member according to the FIG. 2 embodiment, which process corresponds to the previously described manufacturing process except as hereinafter set out. FIG. 6 illustrates a closure blank in which an annular channel 66 has been stamped at the marginal edge. As with the closure member illustrated in FIG. 1, the blank is bent or formed radially outwardly of the recess 24 into a frustoconical shape. An additional bend is made at the marginal edge to form the annular rim 64. FIG. 7 illustrates a cup-shaped member 12 positioned in engagement with the closure member 18 preparatory to the joiniing of these parts to their FIG. 2 condition. As FIG. 7 illustrates, the marginal edge 58 of the cup-shaped member 12 rests against the wall 70 of groove 66 and supports the cup-shaped member in proper position for crimping of the components to their FIG. 2 condition.

FIGS. 8 and 9 illustrate my novel way of forming an opening for fluid flow through a closure member 76. Member 76 may be of my novel unitary design or of the prior multipart type. Central opening 78 forms a part of the fluid flow path through member 76, the other part of the path being formed by at least one other opening 80 which is radially spaced from opening 78. Openings 80 are defined by portions of closure 76 which lie on either side of slits 82, which communicate through the material from which the closure is made, from one surface thereof to the other. One of the portions 84 is, in part, displaced in a direction perpendicular to the plane of the closure a distance greater than the closure material thickness to define an opening 80, as is best viewed in FIG. 9.

The use of a filter having a unitary closure member according to my invention corresponds exactly with known filters and no further explanation to those skilled in the art is deemed necessary.

I claim:

1. The method of making an oil filter housing comprising the steps of providing a cup-shaped housing member having a side wall defining an open end, said open end having a marginal edge defining the opening into said cup-shaped member, forming a bead at the marginal edge of said cup-shaped member, providing a closure member for the open end of said cup-shaped member, said closure member defining a marginal edge, the marginal edge of said closure member being of substantially the same thickness at the rest of said closure member, the thickness of said closure member being substantially greater than the thickness of said side wall of the cup-shaped member, bending said marginal edge into an annular rim, forming an annular bead-receiving cavity in said rim, installing the bead on the marginal edge of said cup-shaped member into said cavity, bending said rim into permanent engagement with said bead while maintaining the thickness of said rim of said closure member substantially equal to the thickness of the rest of the closure member and substantially greater than the thickness of said side wall.

2. The method of claim 1, wherein said bead-receiving cavity is formed by cutting a circumferentially extending groove in said marginal edge circumscribing said closure member before said marginal edge is bent to form said rim.

3. The method of claim 1, wherein said bead-receiving cavity is formed by bending a portion of said rim so that it extends parallel to the plane of the closure member and projects inwardly toward the center of the latter.

* * * * *